US009153986B1

(12) United States Patent
Herr et al.

(10) Patent No.: US 9,153,986 B1
(45) Date of Patent: Oct. 6, 2015

(54) VERSATILE PLUG AND PLAY CHARGING STATION

(71) Applicant: Fuelbox, Inc., Santa Barbara, CA (US)

(72) Inventors: Robert Herr, Santa Barbara, CA (US); Daniel Friedman, Santa Barbara, CA (US); John Stump, Santa Barbara, CA (US); Paul Beierle, Carpinteria, CA (US); Jon Frost, Santa Barbara, CA (US)

(73) Assignee: Fuelbox, Inc., Santa Barbara, CA (US)

( * ) Notice: Subject to any disclaimer, the term of this patent is extended or adjusted under 35 U.S.C. 154(b) by 0 days.

(21) Appl. No.: 14/687,777

(22) Filed: Apr. 15, 2015

Related U.S. Application Data

(60) Provisional application No. 61/979,908, filed on Apr. 15, 2014.

(51) Int. Cl.
*H02J 7/00* (2006.01)
(52) U.S. Cl.
CPC .................... *H02J 7/0044* (2013.01)
(58) Field of Classification Search
CPC .................................................. H02J 7/00454

USPC .......................................................... 320/114
See application file for complete search history.

(56) References Cited

U.S. PATENT DOCUMENTS

| 2012/0281392 | A1 | 11/2012 | Workman et al. |
| 2013/0043826 | A1 | 2/2013 | Workman et al. |
| 2013/0043827 | A1 | 2/2013 | Weinstein et al. |
| 2013/0162210 | A1 | 6/2013 | Tang et al. |
| 2014/0357094 | A1 | 12/2014 | Kim |
| 2015/0015180 | A1 | 1/2015 | Miller et al. |
| 2015/0028797 | A1 | 1/2015 | Miller et al. |

*Primary Examiner* — Edward Tso
*Assistant Examiner* — Ahmed Omar
(74) *Attorney, Agent, or Firm* — SoCal IP Law Group LLP; Steven C. Sereboff; Guy L. Cumberbatch

(57) ABSTRACT

A plug-and-play addition to a traditional electrical outlet that upgrades it to a universally compatible charging station. The unit can be plugged directly into an ordinary electrical outlet or can be secured to the wall with a screw. A removable pod module couples to a docking module plugged into the wall. A positive interface between the two modules holds them together, and an internal battery in the pod module is automatically charged. The interface may be frictionally enhanced with rubberized contact surfaces and magnetic latches. Both modules include integrated flexible charging cables with a variety of connectors for external devices.

20 Claims, 7 Drawing Sheets

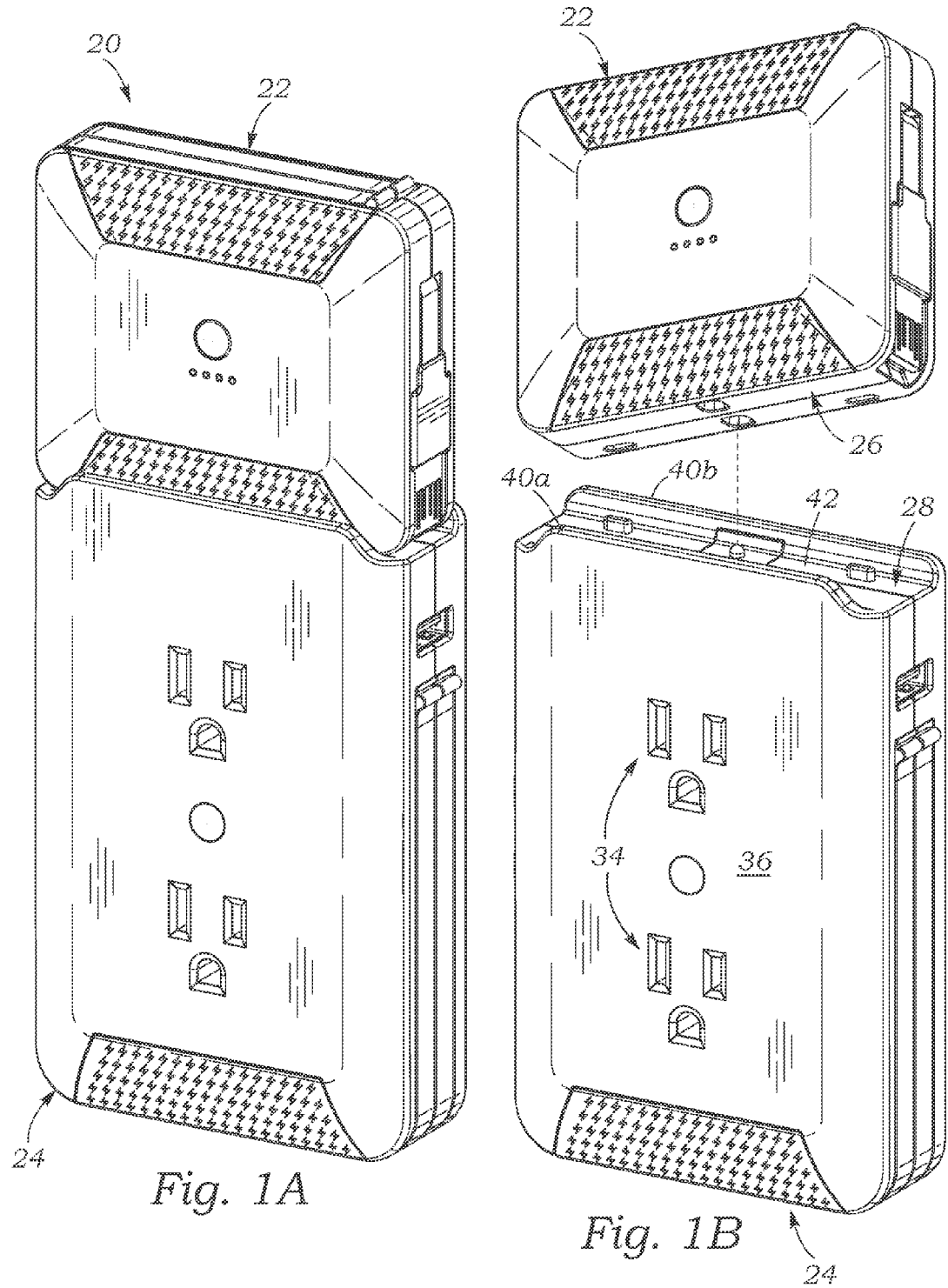

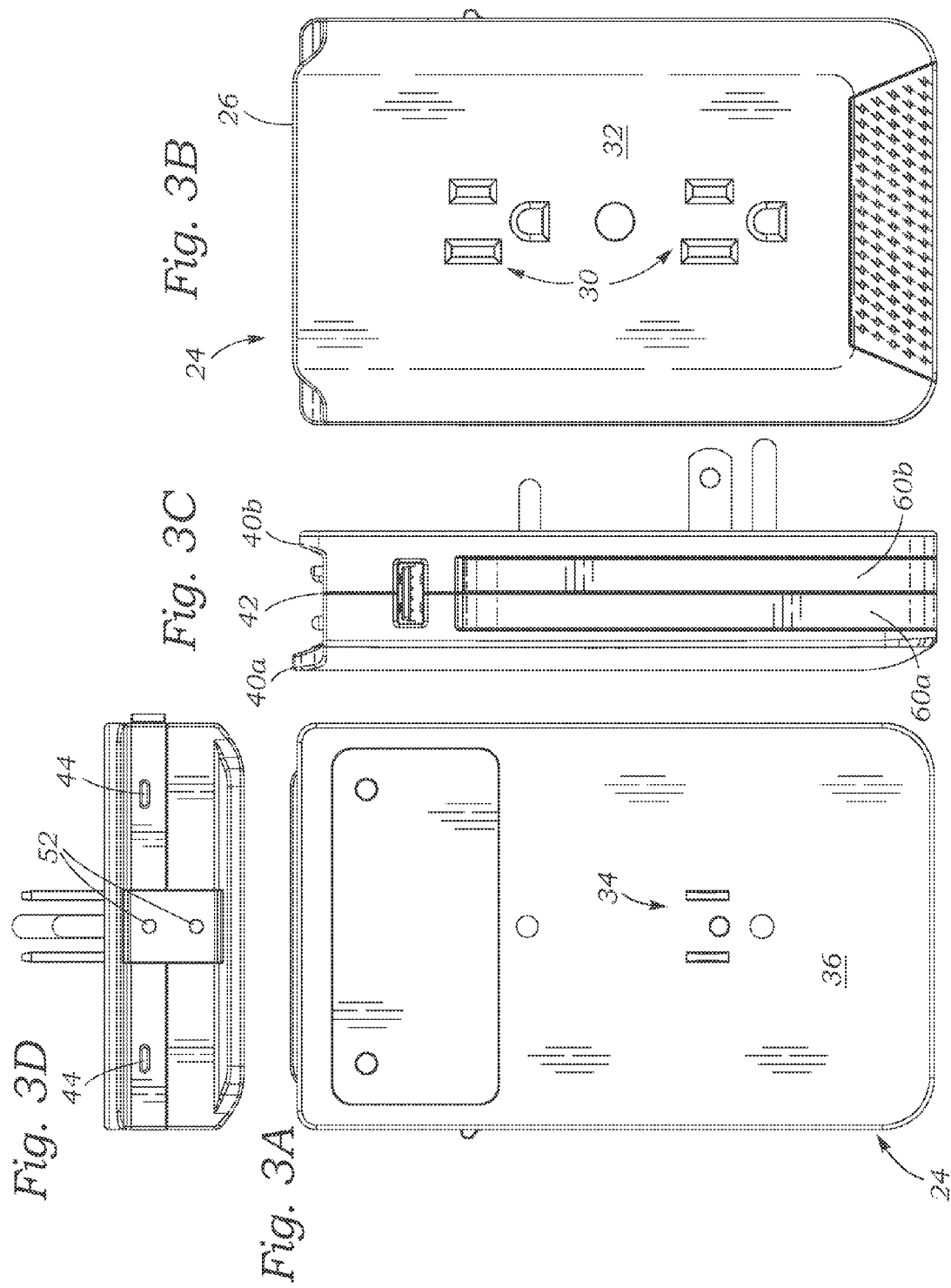

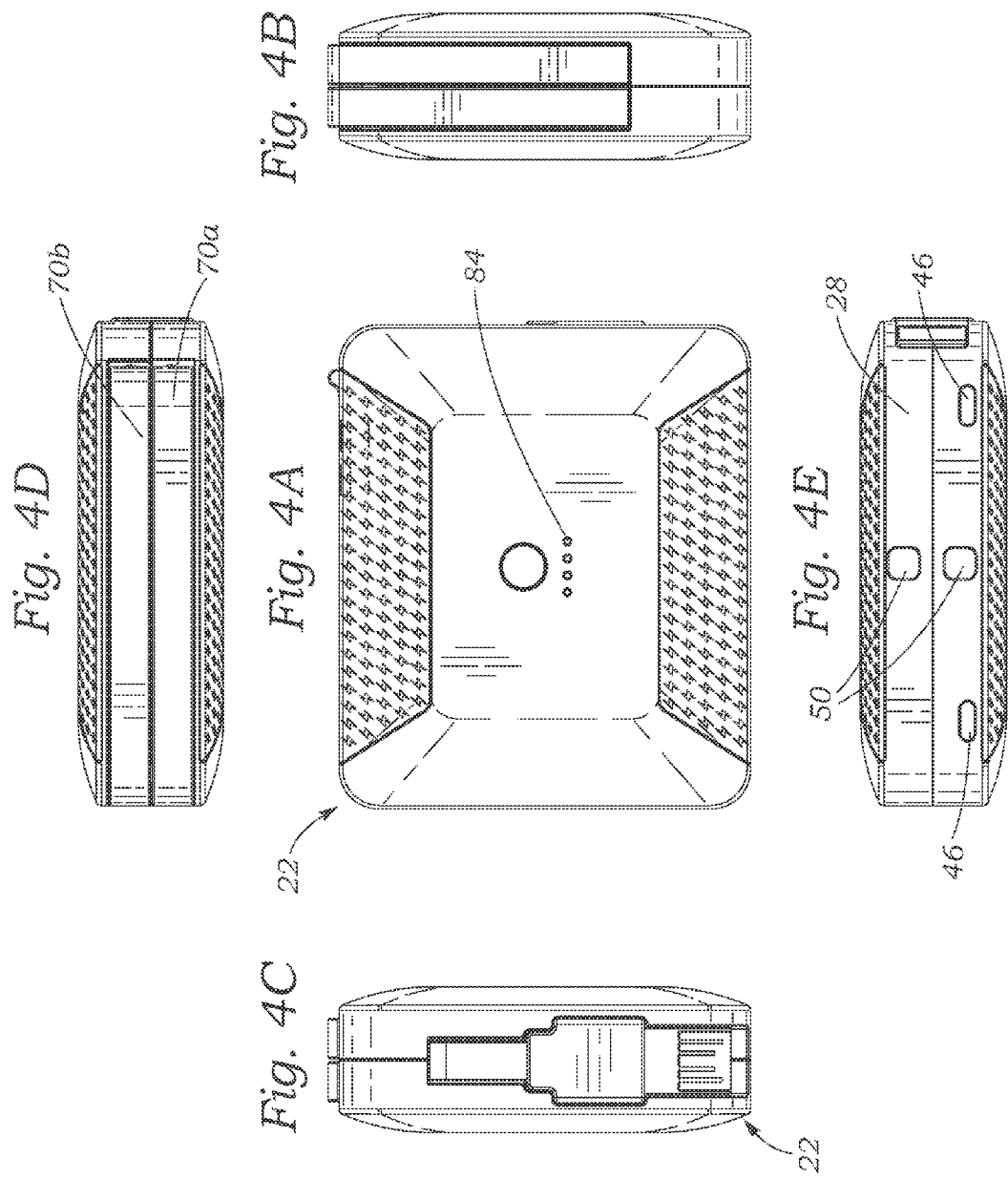

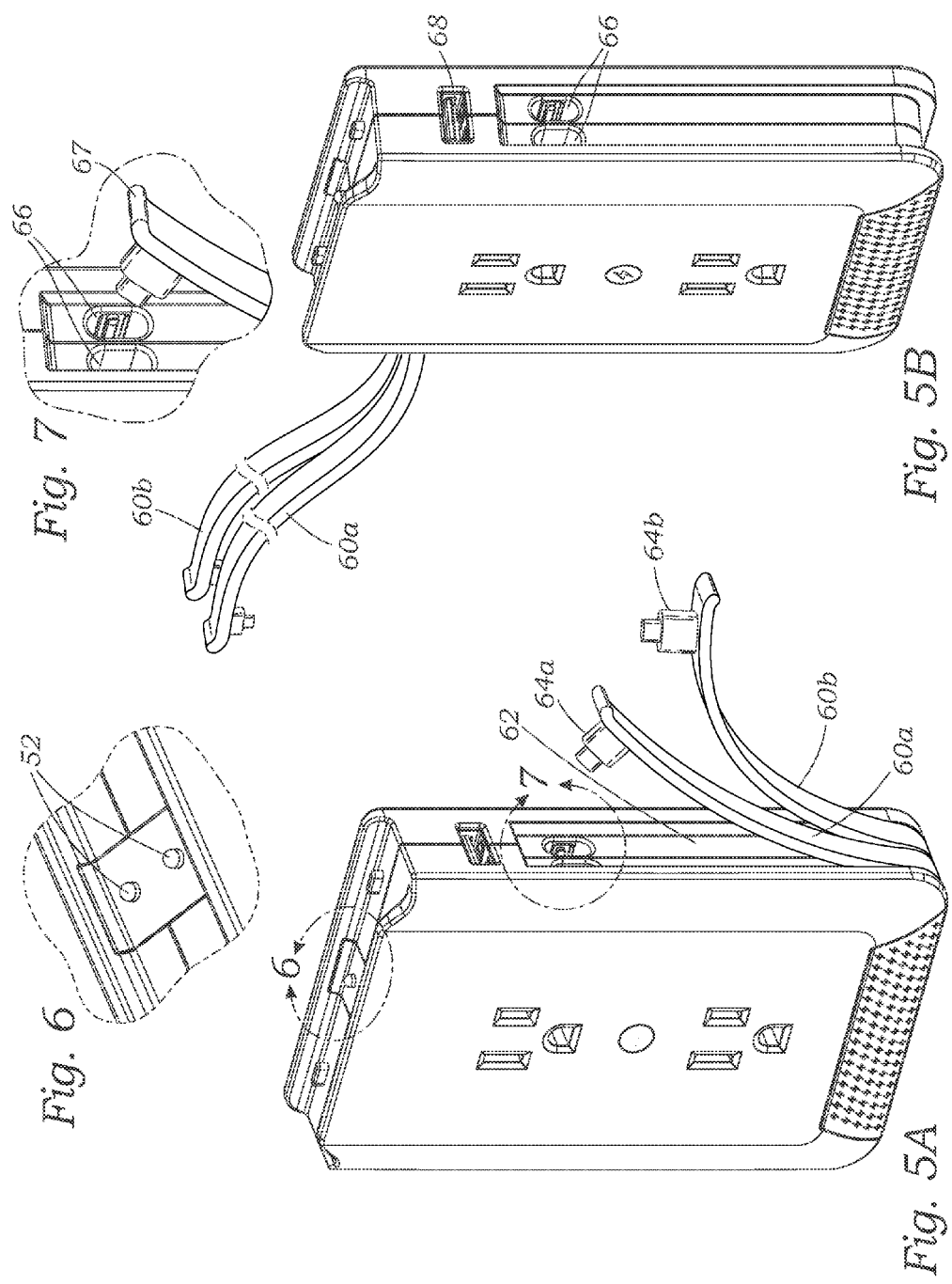

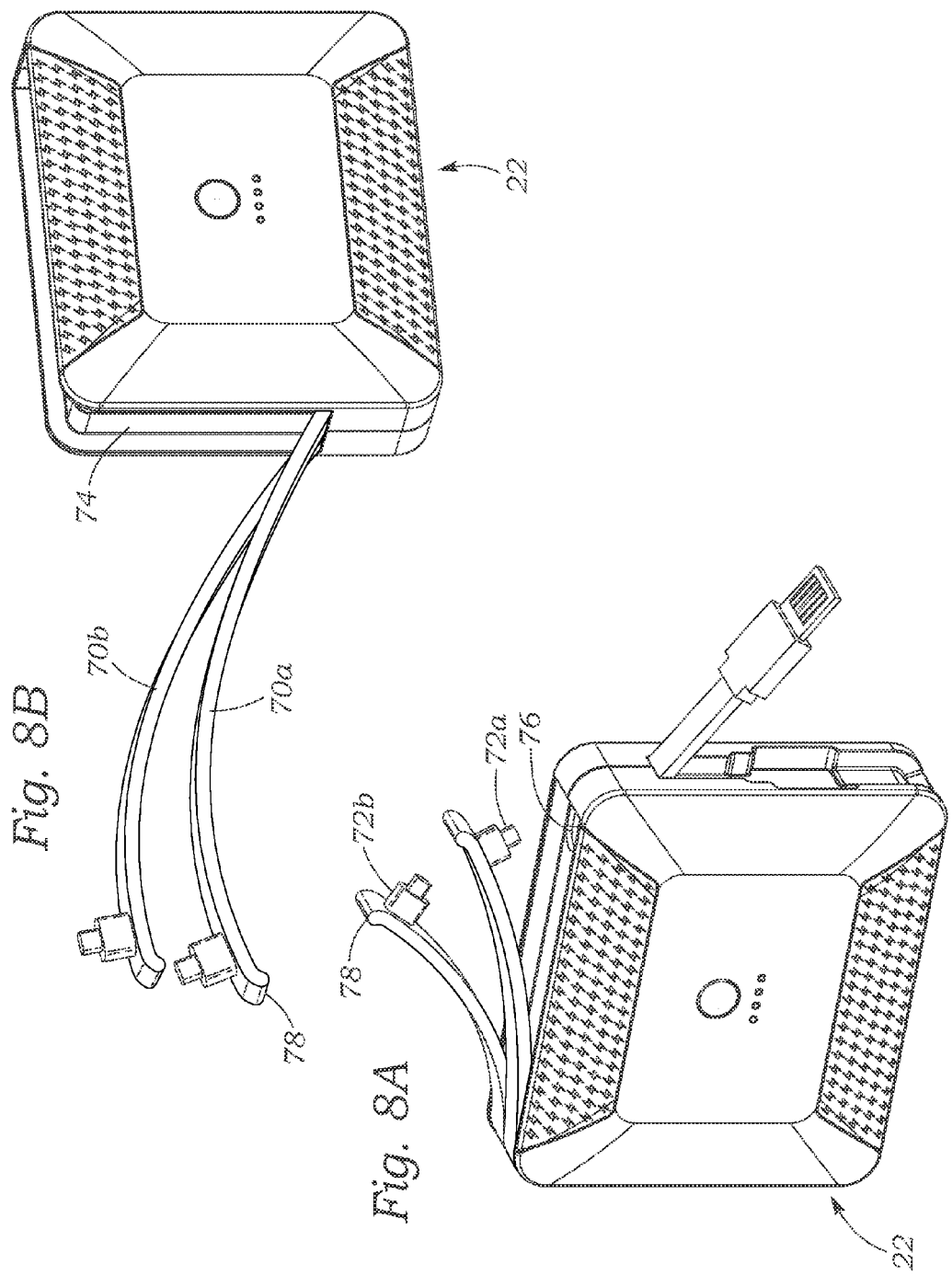

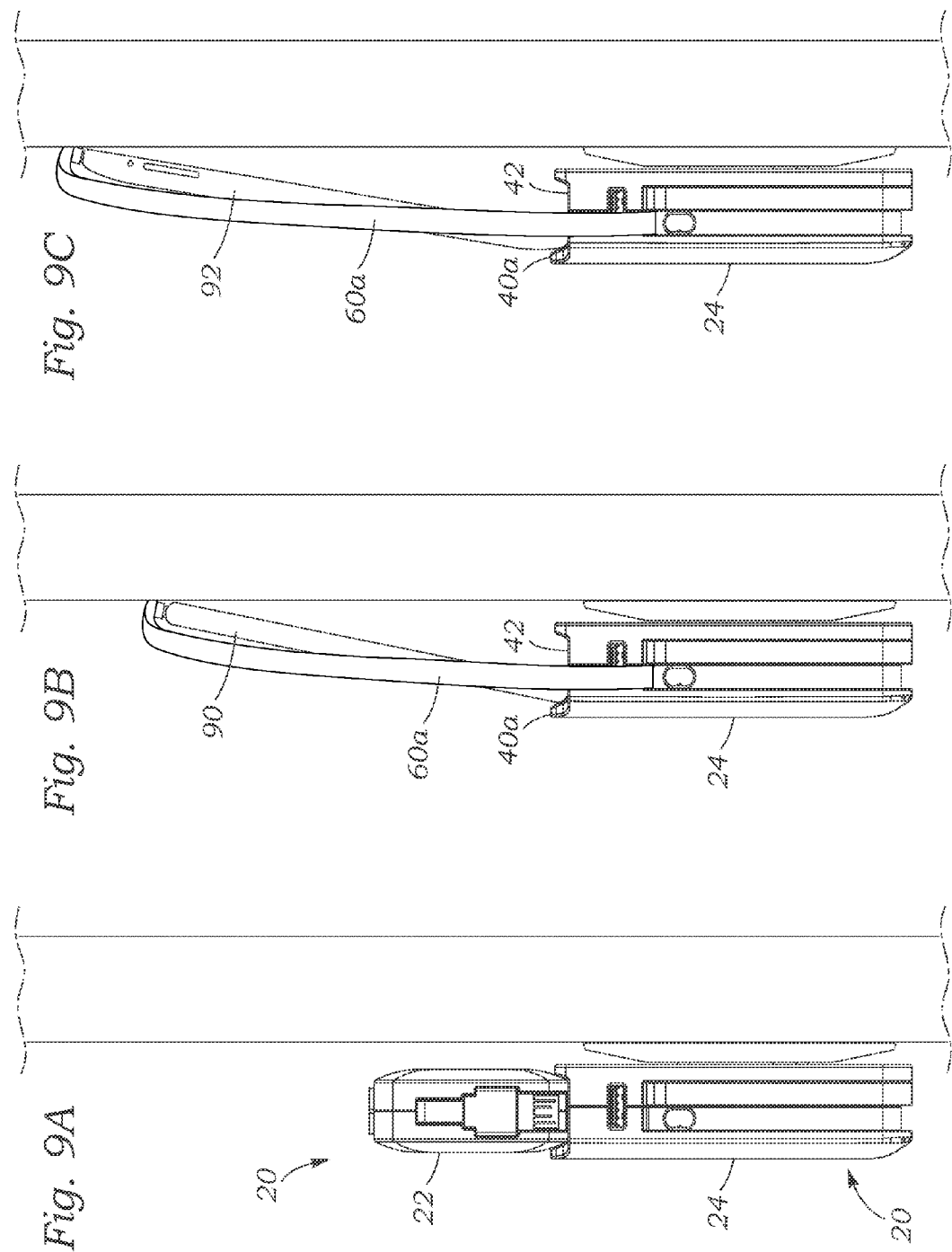

VERSATILE PLUG AND PLAY CHARGING STATION

RELATED APPLICATIONS

The present application claims priority from U.S. Provisional Ser. No. 61/979,908, filed Apr. 15, 2014.

FIELD OF THE INVENTION

This invention relates to device chargers and, more particularly, to a versatile charging station having an outlet-mounted docking module and a removable pod module that provides a portable charging unit.

BACKGROUND

Consumers in 2015 typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces or device plug receptacles. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable device power chargers are illustrated and described in U.S. Patent Publications 2015/0028797, 2015/0015180, and 2013/0043827. The thingCHARGER™ and myCharge™ charging systems are available for charging a variety of portable devices. However, despite numerous such charging systems for portable devices there remains a need for a more ergonomic and versatile system for multiple purpose charging.

SUMMARY OF THE INVENTION

The present application discloses a power station for charging portable and other devices that converts a standard household outlet configuration into a stationary and portable charging assembly. The power station is a combination of a docking module and a removable pod module. The docking module is a simple plug-and-play addition to a traditional electrical outlet that upgrades it to a universally compatible charging station. The docking module can be plugged directly into an ordinary electrical outlet or can be secured to the wall with three simple steps.

$1^{st}$: unscrew the traditional faceplate and remove.

$2^{nd}$: plug the docking module into the existing electrical outlet.

$3^{rd}$: Secure the docking module to the wall by inserting a screw until fastened.

The docking module may include a hubcap that covers the existing screw from showing. The docking module preferably contains built-in or integrated, flexible, chargers for a variety of chargeable devices. The flexible arms use magnetic technology to house the charging tips inside the docking module when not in use. The docking module desirably has a lipped top edge that acts as a safe and secure display shelf for when tablets and smartphones are charging. The docking module further may include 2 surge protected AC outlets and an additional USB port for charging additional devices such as gaming devices, cameras, batteries and other devices with various charging cords. The docking module also has magnetic and electrical contacts on the top for easily connecting to the removable pod module.

The removable pod module clips onto the docking module like a cartridge. The removable pod module is a portable battery pack that also has built-in, flexible chargers for a variety of chargeable devices. The removable pod module easily connects to the docking module via the magnets on the bottom of the removable pod module. On the bottom of the removable pod module, there is a flat open-faced USB cord that can fold out and re-charge the battery via any traditional USB port. The removable pod module is preferably equipped with LED light strips to indicate level of battery life available.

DESCRIPTION OF THE DRAWINGS

FIG. 1A is a front perspective assembled view of an exemplary charging station having an outlet-mounted docking module and a pod module removably coupled thereto, and FIG. 1B is a perspective view of the two components exploded;

FIGS. 3A-3D are front, rear, left side, and top plan views, respectively, of the exemplary outlet-mounted docking module;

FIGS. 4A-4E are front, left side, right side, top and bottom plan views, respectively, of the exemplary removable pod module;

FIGS. 5A and 5B are frontal perspective views of the exemplary outlet-mounted docking module showing extension of a pair of flexible charging cables;

FIGS. 6 and 7 are detailed views of top and side edges of the docking module taken from FIG. 5A;

FIGS. 8A and 8b are frontal perspective views of the exemplary removable pod module showing extension of a pair of flexible charging cables; and FIG. 9A is a side elevational view showing the exemplary charging station plugged into an outlet, and FIGS. 9B and 9C show just the docking module in the outlet with the pod module replaced with two different external portable devices.

DETAILED DESCRIPTION

Figure 2A:
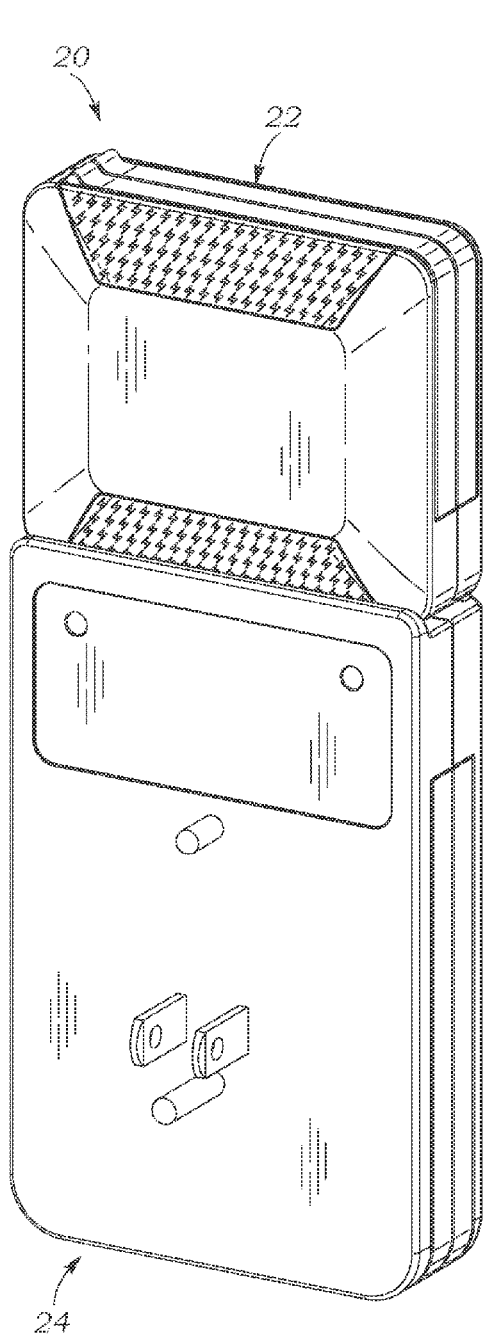
FIGS. 2A and 2B are rear perspective assembled and exploded views, respectively, of the exemplary charging station.
Figure 2B:
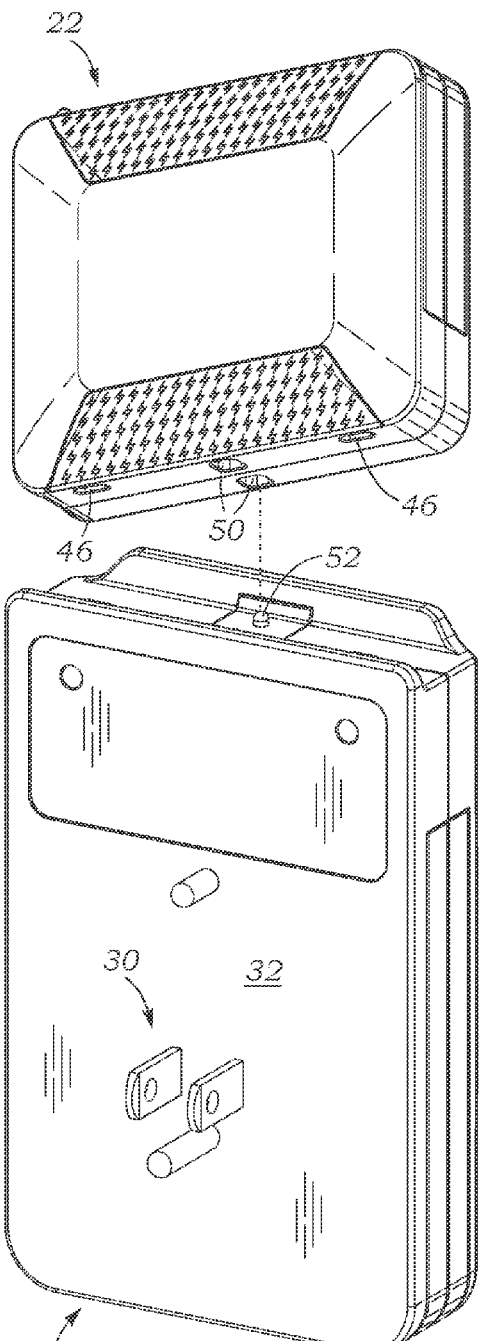

FIG. 1A is a front perspective assembled view and FIG. 2A a rear perspective assembled view of an exemplary charging station 20 having an upper pod module 22 coupled to and supported by an outlet-mounted docking module 24. The modules 22, 24 are shown generally rectilinear with rounded corners though other shapes are contemplated. FIGS. 1B and 2B are front and rear perspective view of the two modules 22, 24 exploded. FIGS. 3A-3D are various orthogonal views of the exemplary outlet-mounted docking module 24, and FIGS. 4A-4E are orthogonal views of the exemplary removable pod module 22.

Preferably, an upper edge 26 of the docking module 24 mates with a lower edge 28 of the pod module 22, and more preferably these edges are linear and horizontal. The docking module 24 includes a three-pronged male outlet plug 30 on a planar rear face 32 thereof, and a pair of female outlet plug receptacles 34 on a planar front face 36. For the sake of orientation, forward will be away from a wall outlet and rearward will be toward the outlet, and lateral left and right directions (looking from the front) extend horizontally and parallel to the front and rear faces 32, 36. The male outlet plug 30 of the docking module 24 may simply be inserted into the outlet, or a screw (not shown) may be provided for better securement. The docking module 24 may have a hubcap (not numbered) that covers the head of the screw from showing.

FIGS. 1B and 2B show coupling structure on the mating edges 26, 28. More particularly, the upper edge 26 of the docking module 24 includes a pair of linear rails 40a, 40b on front and rear corners thereof that extend in parallel to each other and define therebetween an upwardly-facing channel 42. The front-to-rear thickness of the docking module 24 is greater than that of the pod module 22 such that the channel 42 receives the pod module snugly therein with the rounded lower corners of the pod module fitting closely within the rounded inner corners of the channel. The pod module 22 is thus supported on the horizontal channel 42 of the docking module 24 as shown in FIGS. 1A and 2A. Both of the docking module 24 and pod module 22 preferably have rubberized exterior surfaces to create a high degree of friction therebetween to help stabilize the pod module 22 on the docking module 24. Indeed, the sizes of the modules 22, 24 are such that there is horizontal and vertical surface contact between the two for maximum stability. Moreover, as will be explained below, the rubberized horizontal channel 42 provide a relatively wide and deep platform on which to support a variety of other external devices for charging.

A positive latching mechanism is desirably provided between the lower edge 28 of the pod module 22 and upper edge 26 of the docking module 24 to additionally secure the two parts together. In a preferred embodiment, the upper edge 26 of the docking module 24 has a magnetic latch embedded therein which engages a mating magnetic latch within the lower edge 28 of the pod module 22. For instance, FIGS. 2B, 3D and 4E show two magnetic latches 44 on the docking module 24 spaced apart the same distance as two magnetic latches 46 on the pod module 22. These magnetic latches may be opposite permanent magnets or one permanent magnet and a ferrous counterpart, and various combinations are possible as the reader will appreciate. Spacing the magnetic latches 44, 46 apart in this manner provide additional lateral stability from someone knocking the pod module 22 off of the docking module 24. In one embodiment, the overall width of the pod module 22 is between 3-5 inches, and the magnetic latches 44, 46 are spaced apart by at least 2-inches. For instance, a 3-inch wide pod module 22 has magnetic latches 46 spaced apart 2-inches, a 4-inch wide pod module 22 has magnetic latches 46 spaced apart 3-inches, and a 5-inch wide pod module 22 has magnetic latches 46 spaced apart 4-inches.

Still with reference to FIGS. 2B and 4E, the lower edge 28 of the pod module 22 includes two upper electrical contacts 50 that are preferably centered laterally and positioned to mate with two lower electrical contacts 52 on the upper edge 26 of the docking module 24. The electrical contacts 52 on the docking module 24 are seen enlarged in FIG. 6. These contacts 50, 52 engage when the pod module 22 is centered on the channel 42, which is easily visualized as the two modules 22, 24 are approximately the same lateral width and also facilitated by virtue of the centering forces of the magnetic latches 44, 46. The engaged contacts 50, 52 permit charging of an internal battery within the pod module 22 from power derived from the outlet into which the docking module 24 is plugged or from an internal battery of the docking module 24 (optional).

Now with reference to FIGS. 5A and 5B, the exemplary outlet-mounted docking module 24 is shown with a plurality of integrated flexible charging cables 60a, 60b extended therefrom. The two "built-in" flexible cables 60a, 60b emerge from within the outer housing of the docking module 24 at an upper left end of a peripheral groove 62. The groove 62 extends from an upper point on the left edge of the module 24, around the bottom edge, and terminates at an upper point on the right edge, as seen in FIGS. 3C and 5A/5B. The groove 62 is recessed from outer corners of the rectangular docking module 24 such that the cables 60a, 60b, which are desirably flat in profile, lie substantially flush with the housing of the module, as seen best in FIGS. 3A and 3B. Each of the cables 60a, 60b terminates in an electrical charging connector 64a, 64b. Preferably, both connectors 64a, 64b extend perpendicular to the flat cables 60a, 60b and fit snugly within similar-sized and shaped receptacles 66 provided at the end of the groove 62, as seen in FIGS. 5B and 7. Furthermore, in a preferred embodiment the cables 60a, 60b and/or connectors 64a, 64b may be magnetically retained within the groove 62 and receptacles 66 by providing one or more magnets within the housing that attracts the metallic conductors within the cables and/or connectors. The cables 60a, 60b and connectors 64a, 64b are thus "built-in" to the box shape of the docking module 24 and may be tidily stowed away when not in use. Each cable 60a, 60b may have a small outwardly-bent end 67 molded therein to permit easy extraction of the cable from the groove 62.

Although two cables are shown, three or more could be provided. For example, one embodiment includes three flexible silicon cables with different charger tips such as Micro-USB, Apple 30-pin & Apple lightning tips. Conventional power transformers (not shown) are provided within the docking module 24 to convert the AC source power from the outlet to DC power for output to the cables 60a, 60b and connectors 64a, 64b. The AC power is also transformed before output to the two electrical contacts 52 for charging the internal battery of the pod module 22.

FIGS. 5A and 5B also show a separate USB charging port 68 located on the right side of the docking module 24, just above the end of the groove 62. This provides an additional outlet for charging devices on the docking module 24 in addition to the female outlet plug receptacles 34 and the two cables 60*a*, 60*b* with connectors 64*a*, 64*b*. There are thus at least 5 separate charging choices on the docking module 24. Again, the cables 60*a*, 60*b* with connectors 64*a*, 64*b* and the USB charging port 68 derive power from the outlet into which the docking module 24 is plugged. Alternatively, an internal battery of the docking module 24 may also be provided.

FIGS. 8A and 8*b* illustrate the removable pod module 22 with a plurality of "built-in" or integrated flexible charging cables 70*a*, 70*b* and extending therefrom having charging connectors 72*a*, 72*b* (again, three or more may be provided, such as Micro-USB, Apple 30-pin & Apple lightning tips). As with the docking module 24, the pod module 22 features a groove 74 on its side edges that receive the preferably flat charging cables 70*a*, 70*b* so that they lie substantially flush with the outer extent of the rectangular housing of the module, or project slightly outward therefrom as seen in FIGS. 4B and 4C (e.g., no more than 2-3 mm). The groove 74 preferably commences (where the cables 70*a*, 70*b* emerge from the housing) at a lower point along the left edge of the module 22 and terminates at a top edge. Small receptacles 76 in the groove 74 are again provided to receive the connectors 72*a*, 72*b*. Each cable 70*a*, 70*b* may have a small outwardly-bent end 78 molded therein to permit easy extraction of the cable from the groove 74. In a preferred embodiment the cables 70*a*, 70*b* and/or connectors 72*a*, 72*b* may be magnetically retained within the groove 74 and receptacles 76 by providing one or more magnets within the housing that attracts the metallic conductors within the cables and/or connectors.

A self-charging extension 80 is seen angled outward from the right side of the pod module 22 in FIG. 8A. The charging extension 80 may be a TPE micro USB connector and normally resides flush with the side edge of the module in a groove 82. The flat open-faced USB charging extension 80 can fold out and re-charge the internal battery of the pod module 22 via any traditional USB port. This provides versatility to the removable pod module 22 such that it does not require the docking module 24 to recharge.

There are at least 2 charging options provided by the pod module 22, for a total of at least 7 in the entire system 20. The internal battery of the pod module 22 desirably has a capacity for 25 plus hours of life, and a series of LED indicators 84 may be provided on the front face to convey how much power remains. Since the internal battery of the pod module 22 receives and stores DC power, there is no need for internal transformers to provide DC power output to the cables 70*a*, 70*b* and connectors 72*a*, 72*b* and charging extension 80.

FIG. 9A is a side elevational view showing the exemplary charging station 20 plugged into an outlet. The pod module 22 is shown firmly supported or docked on the top edge of the docking module 24 in the channel 42 between the two linear rails 40*a*, 40*b*. The combination of the rails 40*a*, 40*b*, rubberized contacting surfaces and positive magnetic latches 44, 46 (FIGS. 2B, 3D) secure the pod module 22 in place. While docked, the pod module 22 may be used to charge external devices without using up any internal battery power. Indeed, any of the various charging extensions described above on either the pod module 22 or docking module 24 may be used to charge devices, and the outlet sockets 34 on the docking module 24 can be used simultaneously.

FIGS. 9B and 9C show just the docking module 24 in the outlet with the pod module 22 replaced with two different external portable devices 90, 92. For instance, a smart phone 90 or tablet computer 92 may be placed on top of the docking module 24. The rubberized upper edge of the docking module 24 in conjunction with the channel 42 defined between the two linear rails 40*a*, 40*b* provides a secure platform or shelf on which to place the devices 90, 92 which can be leaned against the wall above the outlet. One of the charging cables 6*o* is then connected to charge the respective device 90 or 92.

Preferably, the internal battery of the pod module 22 Lithium-ion and ranges from 2000 mAh to 12000 maH. Universal chargers may include Micro-USB, Mini-USB, USB 1.0, USB-C, Apple Lightning, Apple 30-pin, etc., or any other particular charging connectors. The docking module 24 further may include phantom power saving technology that regulates and eliminates wasted power being leaked from standard outlets.

Other possible options include:
- a wireless removable pod module 22 (wireless conductive/contact transmitter or electromagnetic/non-contact transmitter)
- a speaker in the pod module 22 (a pod that incorporates a wireless Bluetooth speaker)
- a baby monitor pod module 22 (a wireless baby monitor pod)
- a nightlight pod module 22
- a motion detection pod module 22
- a smart pod module 22 (connects to your smartphone/tablet and monitors electricity usage, allows users to control different appliances from their mobile)

In this regard, different types of attachments for the top of the docking module 24 are also contemplated, such as for Bluetooth speaker attachments, a nightlight, a battery with another AC outlet like a portable outlet, small screens, baby monitor, tracking devices to find things around your house, speaker phone device, etc. Of course, the system 20 may be adapted for use in various countries with their different outlet configurations.

Additionally, the system 20 may be adapted for public charging stations for use in airports, transit centers, shopping malls, convention centers, etc. Likewise, a kiosk with power stations, tables, seating for charging up devices may be constructed with wrapped seating and power stations. Also, the system 20 is well-suited as a charging solution for hospital beds and hospitals. A dock or holster for the pod module 22 may be provided in a car to hold and charge the pod module 22.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to any flowcharts if included, additional and fewer steps may be taken, and the steps as shown may be combined or further refined to achieve the methods described herein. Acts, elements and features discussed only in connection with one embodiment are not intended to be excluded from a similar role in other embodiments.

It is claimed:

1. A charging system, including:
   a) a docking module having a male outlet plug adapted to be inserted into a wall power outlet, a transformer for converting the AC wall power into DC power, an upper edge with a pair of lower electrical connectors that receive the DC power, and at least one integrated flexible charging cable that receives the DC power terminating in a charging connector for an external device, the upper edge further including a pair of rails that define an upwardly-facing channel therebetween; and b) a pod module having a lower edge sized and shaped to fit snugly within the upwardly-facing channel of the docking module, the pod module thus being supported above the docking module, the lower edge having a pair of upper electrical connectors that engage the lower electrical connectors of the docking module and receive DC power, the pod module having an internal battery that is connected to be charged by the DC power received by the upper electrical connectors, the pod module further including at least one integrated flexible charging cable that receives the DC power terminating in a charging connector for an external device.

2. The system of claim 1, wherein the upper edge of the docking module and the lower edge of the pod module have rubberized exterior surfaces that contact each other for enhanced friction.

3. The system of claim 2, wherein the upper edge of the docking module and the lower edge of the pod module have cooperating magnetic latches that engage each other for enhanced retention of the pod module on the docking module.

4. The system of claim 1, wherein the upper edge of the docking module and the lower edge of the pod module have cooperating magnetic latches that engage each other for enhanced retention of the pod module on the docking module.

5. The system of claim 4, wherein the cooperating magnetic latches include spaced laterally apart latches for added stability.

6. The system of claim 1, wherein the upper edge of the docking module is linear and horizontal, and the pair of rails comprises a pair of front and rear linear horizontal rails that define therebetween the upwardly-facing channel, and the lower edge of the pod module is linear and has a thickness that fits closely between the rails.

7. The system of claim 6, wherein the upper edge of the docking module including the rails and the lower edge of the pod module have rubberized exterior surfaces that contact adjacent surfaces of each other for enhanced friction.

8. The system of claim 1, wherein the docking module has at least two integrated flexible charging cables terminating in charging connectors for different external devices, and the pod module also has at least two integrated flexible charging cables terminating in charging connectors for different external devices.

9. The system of claim 1, wherein the docking module includes a peripheral groove within which the integrated flexible charging cables and charging connectors are received to lie substantially flush against outer corners of the docking module, and the pod module includes a peripheral groove within which the integrated flexible charging cables and charging connectors are received to lie substantially flush against an external edge of the pod module.

10. The system of claim 1, wherein the pod module further includes a self-charging extension with a USB connector that normally resides flush with a side edge of the pod module in a groove and folds out enabling connection with an external USB power source to enable recharging of the internal battery of the pod module in a manner other than through the upper and lower electrical connectors.

11. The system of claim 1, wherein the pod module includes an LED indicator on a front face thereof that indicates remaining internal battery life.

12. A charging system, including:
a) a docking module having a male outlet plug adapted to be inserted into a wall power outlet, a transformer for converting the AC wall power into DC power, an upper edge with a pair of lower electrical connectors that receive the DC power, the upper edge further including a pair of rails that define an upwardly-facing channel therebetween and a pair of spaced apart magnetic latches; and
b) a pod module having a lower edge sized and shaped to fit snugly within the upwardly-facing channel of the docking module, the pod module thus being supported above the docking module, the lower edge having a pair of upper electrical connectors that engage the lower electrical connectors of the docking module and receive DC power, the pod module having an internal battery that is connected to be charged by the DC power received by the upper electrical connectors, the pod module including a pair of spaced apart magnetic latches that mate with the magnetic latches on the docking module, the pod module further including at least two integrated flexible charging cables that receive the DC power terminating in charging connectors for different external devices.

13. The system of claim 12, wherein the upper edge of the docking module and the lower edge of the pod module have rubberized exterior surfaces that contact each other for enhanced friction.

14. The system of claim 12, wherein the upper edge of the docking module is linear and horizontal, and the pair of rails comprises a pair of front and rear linear horizontal rails that define therebetween the upwardly-facing channel, and the lower edge of the pod module is linear and has a thickness that fits closely between the rails.

15. The system of claim 14, wherein the upper edge of the docking module including the rails and the lower edge of the pod module have rubberized exterior surfaces that contact adjacent surfaces of each other for enhanced friction.

16. The system of claim 12, wherein the docking module has also at least two integrated flexible charging cables terminating in charging connectors for different external devices.

17. The system of claim 12, wherein the docking module includes a peripheral groove within which the integrated flexible charging cables and charging connectors are received to lie substantially flush against outer corners of the docking module, and the pod module includes a peripheral groove within which the integrated flexible charging cables and charging connectors are received to lie substantially flush against an external edge of the pod module.

18. The system of claim 12, wherein the pod module includes a peripheral groove within which the integrated flexible charging cables and charging connectors are received to lie substantially flush against an external edge of the pod module.

19. The system of claim 12, wherein the pod module further includes a self-charging extension with a USB connector that normally resides flush with a side edge of the pod module in a groove and folds out enabling connection with an external USB power source to enable recharging of the internal battery of the pod module in a manner other than through the upper and lower electrical connectors.

20. The system of claim 12, wherein the pod module includes an LED indicator on a front face thereof that indicates remaining internal battery life.

* * * * *